United States Patent
Li et al.

(10) Patent No.: US 8,902,878 B2
(45) Date of Patent: Dec. 2, 2014

(54) SYNCHRONIZING DATA TRANSMISSION BETWEEN A WIRELESS NETWORK AND A WIRED NETWORK

(71) Applicant: Broadcom Corporation, Irvine, CA (US)

(72) Inventors: Gordon Yong Li, San Diego, CA (US); Victor T. Hou, La Jolla, CA (US); Xuemin Chen, Rancho Santa Fe, CA (US)

(73) Assignee: Broadcom Corporation, Irvine, CA (US)

(*) Notice: Subject to any disclaimer, the term of this patent is extended or adjusted under 35 U.S.C. 154(b) by 126 days.

(21) Appl. No.: 13/720,185

(22) Filed: Dec. 19, 2012

(65) Prior Publication Data

US 2013/0128868 A1     May 23, 2013

Related U.S. Application Data

(63) Continuation of application No. 12/943,454, filed on Nov. 10, 2010, now Pat. No. 8,380,881.

(60) Provisional application No. 61/259,911, filed on Nov. 10, 2009.

(51) Int. Cl.
    *H04J 3/06*         (2006.01)
    *H04L 12/857*      (2013.01)
    *H04W 28/24*      (2009.01)
    *H04W 56/00*      (2009.01)
    *H04L 12/851*      (2013.01)
    *H04L 12/24*       (2006.01)
    *H04L 12/801*      (2013.01)

(52) U.S. Cl.
    CPC .......... *H04W 56/00* (2013.01); *H04L 47/2425* (2013.01); *H04L 47/2491* (2013.01); *H04L 41/0213* (2013.01); *H04L 41/0816* (2013.01); *H04L 47/14* (2013.01); *H04L 47/2408* (2013.01); *H04W 28/24* (2013.01)
    USPC .......................................................... 370/350

(58) Field of Classification Search
None
See application file for complete search history.

(56) References Cited

U.S. PATENT DOCUMENTS

| | | | | |
|---|---|---|---|---|
| 7,321,599 | B1* | 1/2008 | Yen et al. | 370/466 |
| 8,077,614 | B2* | 12/2011 | Ji et al. | 370/230 |
| 8,254,355 | B2* | 8/2012 | Park | 370/338 |
| 2003/0115610 | A1* | 6/2003 | Cho | 725/111 |
| 2004/0158649 | A1* | 8/2004 | Ophir et al. | 709/250 |
| 2005/0034159 | A1* | 2/2005 | Ophir et al. | 725/78 |
| 2005/0085259 | A1* | 4/2005 | Conner et al. | 455/552.1 |
| 2006/0089138 | A1* | 4/2006 | Smith et al. | 455/426.1 |

(Continued)

*Primary Examiner* — Otis L Thompson, Jr.
(74) *Attorney, Agent, or Firm* — Sterne, Kessler, Goldstein & Fox P.L.L.C.

(57) ABSTRACT

Methods, systems and computer program products to synchronize timing of data transmissions between wireless and wired networks using a combined wireless gateway and cable modem are provided herein. The method includes the step of generating an indicator prior to a look-ahead time period and transmitting a poll to a wireless device upon sending the indicator. The look-ahead time period is a time period from transmitting the indicator to transmitting the DOCSIS frame. The method further includes the step of receiving data from the wireless device and encapsulating the data in a DOCSIS format to generate a DOCSIS frame. The method also includes transmitting the DOCSIS frame at a start of a next transmit opportunity to a cable modem termination system (CMTS).

20 Claims, 8 Drawing Sheets

(56) References Cited

U.S. PATENT DOCUMENTS

| | | | |
|---|---|---|---|
| 2007/0037578 A1* | 2/2007 | Besterman | 455/445 |
| 2007/0121550 A1* | 5/2007 | Wada | 370/332 |
| 2007/0140195 A1* | 6/2007 | Kaftan | 370/338 |
| 2007/0147484 A1* | 6/2007 | Lee | 375/149 |
| 2007/0249317 A1* | 10/2007 | Williams et al. | 455/402 |
| 2008/0062925 A1* | 3/2008 | Mate et al. | 370/331 |
| 2008/0141296 A1* | 6/2008 | Yoon | 725/31 |
| 2011/0113156 A1* | 5/2011 | Li et al. | 709/248 |

* cited by examiner

SYNCHRONIZING DATA TRANSMISSION BETWEEN A WIRELESS NETWORK AND A WIRED NETWORK

CROSS REFERENCE TO RELATED APPLICATIONS

This application is a continuation of U.S. patent application Ser. No. 12/943,454, filed Nov. 10, 2010, which claims the benefit of U.S. Provisional Application No. 61/259,911, filed Nov. 10, 2009, both of which are incorporated herein by reference in their entirety.

BACKGROUND OF THE INVENTION

1. Field of the Invention

The present invention generally relates to networks and more specifically to synchronizing data transmission between a wireless network and a wired network.

2. Background Art

In communication systems, data received over a wireless network may have to be further transmitted over a wired network. However, the timing between receiving data over the wireless network and transmitting the received data over the wired network may not be synchronized. The lack of synchronization may lead to time lags that result in an undesirable quality of service.

Methods, systems and computer program products are needed to overcome the above described deficiency.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings.

Figure 1A:
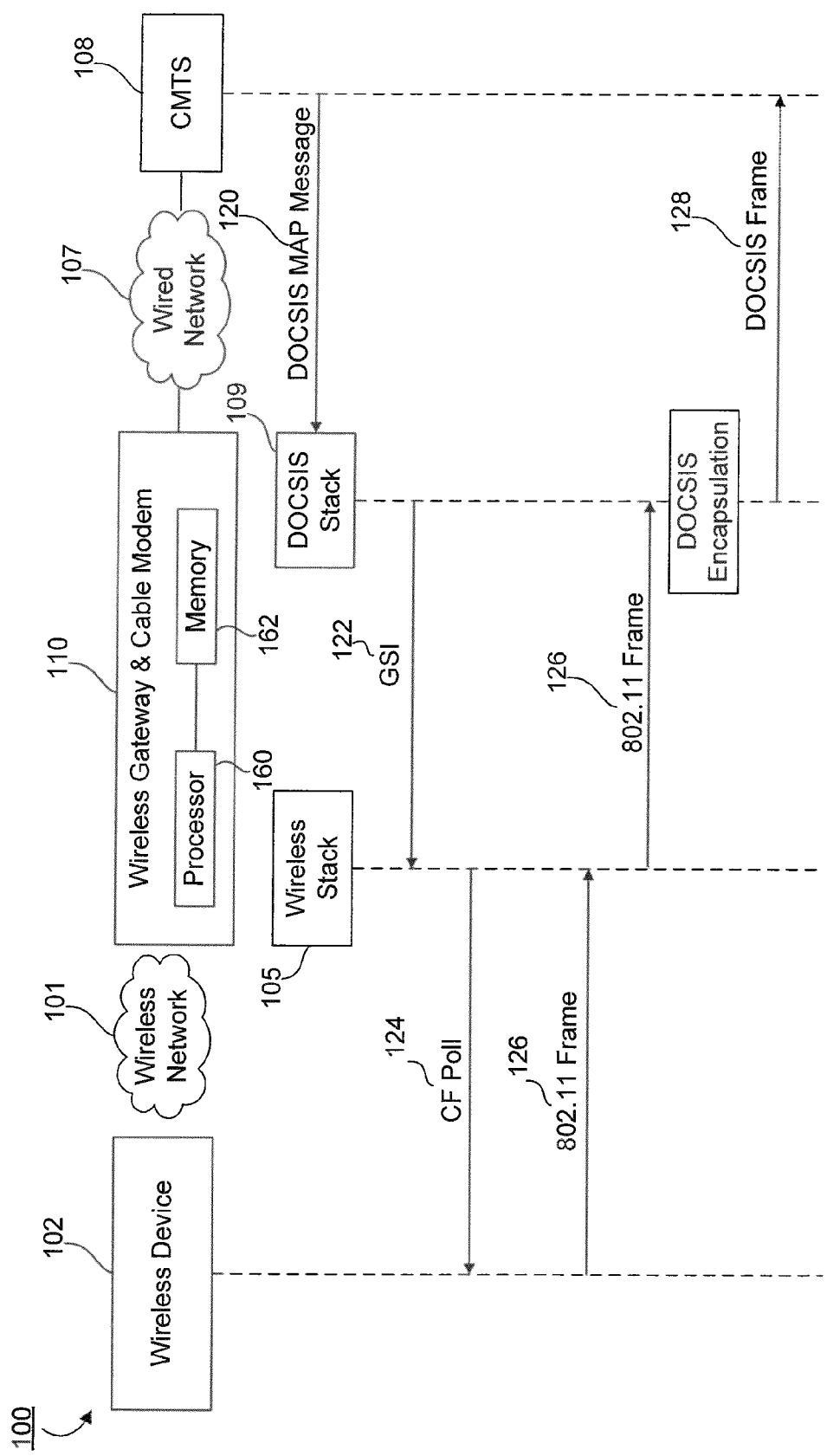
FIG. 1A illustrates an example communication system according to an embodiment of the invention.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Embodiments presented herein provide methods, systems and computer program products to synchronize timing of data transmissions between wireless and wired networks. The objective of synchronization as described herein is to minimize the time between receiving a data frame from the wireless network and transmitting the received data frame to the wired network. While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

FIG. 1A illustrates an example communication system 100 according to an embodiment of the invention. System 100 includes wireless device 102, wireless gateway and cable modem 110 and CMTS 108. In the embodiment in FIG. 1A, wireless gateway 104 and cable modem 106 (shown in FIG. 2A) are combined into a single physical unit which is wireless gateway and cable modem 110. In an example, wireless gateway and cable mode 110 may operate using a single processor that is configured to perform the functions of both wireless gateway 104 and cable modem 106. Alternatively, wireless gateway and cable modem 110 may be a single physical device that includes multiple processors with a first processor implementing a functionality of wireless gateway 104 and a second processor implementing functionality of cable modem 106.

In the embodiment shown in FIG. 1A, wireless device 102 communicates with wireless gateway and cable modem 110 using Institute of Electrical and Electronics Engineers (IEEE) 802.11(e) frames. Wireless gateway and cable modem 110 encapsulates data in the IEEE 802.11(e) frames received from wireless device 102 into DOCSIS frames that are transmitted over a wired network 107, for example a DOCSIS network, to cable modem termination system 108. Cable modem termination system 108 may encapsulate or translate data from DOCSIS frames or packets into Internet Protocol (IP) frames and transmit the IP frames over an Internet network (not shown).

A "wireless device" as described herein refers to a device that can communicate wirelessly with other devices i.e. without using tangible physical media such as coaxial cables, twisted pair Ethernet cables, optical fibers etc. For example, wireless device 102 is any device that can communicate wirelessly over wirelessly over wireless network 101. In an example, wireless device 102 may be referred to as a WiFi station (WiFi STA or simply STA). Wireless device 102 may be, for example, any wireless device including but not limited to a cellular phone (including a smart phone, for example, an iPhone™), a wireless laptop or any device enabled to communicate over wireless network 101.

A "wireless network" as referred to herein may refer to any network that transmits and receives data between two or more devices without using physical media such as wires or cables. In an example, wireless network 101 is based on Institute of Electrical and Electronics Engineers (IEEE) 802.11(e) protocol for wireless communication networks. In another example, wireless network 101 may be referred to as a Wireless Local Area Network (WLAN) or a WiFi™ network.

Cable modem 106 (see FIG. 2A) communicates with cable modem termination 108 using a Data Over Cable Service Interface Specification (DOCSIS) protocol. Cable modern 106 and CMTS 108 are both referred to as "wired devices" herein. A "wired device" as described herein refers to a device that communicates using tangible physical media including but not limited to coaxial cables, twisted pair Ethernet cables, optical fibers etc. Cable modem 106 may communicate with wireless gateway 104 using Ethernet frames over an Ethernet network.

Wireless gateway and cable modem 110 and wireless gateway 104 (see FIG. 2A) can be considered as both wired and wireless devices. For example, wireless gateway and cable modem 110 can transmit and receive data both wirelessly and through wires. Wireless gateway and cable modem 110 can communicate with wireless device 102 and can also communicate with cable modem 106. Wireless gateway and cable modem 110 can communicate with wireless device 102 using 802.11 frames over wireless network 101. Wireless gateway and cable modem 110 can also communicate with CMTS 108 over wired network 107. Thus wireless gateway and cable modem 110 serves as a conduit that bridges wireless network 101 and wired network 107. Both wireless gateway and cable modem 110 and wireless gateway 104, may also be referred to as a wireless access point (AP), a radio or a "wireless hotspot."

In DOCSIS communication systems, cable modem termination system 108 transmits a DOCSIS "MAP" message as defined in the DOCSIS specification, to cable modem 106 or a combined wireless gateway and cable modem 110 to indicate "future transmit opportunities." The future transmit opportunities as described herein are particular time slots during which the cable modem 106 or combined wireless gateway and cable modem 110 can transmit data to the cable modem termination system 108. Future transmit opportunities may include one or more "next transmit opportunities." A next transmit opportunity as described herein refers to a next time slot, from the multiple time slots allotted in future transmit opportunities, during which cable modem 106 or combined wireless gateway and cable modem 110 can transmit data received from wireless device 102 to the cable modem termination system 108.

In wireless networks that conform to IEEE 802.11(e), a contention free (CF) poll is periodically sent by a wireless gateway 104 or by a combined wireless gateway and cable modem 110 to a wireless device 102 to request data. Upon receiving a CF poll, the wireless device 102, if it has data to transmit, transmits data in an 802.11 frame to the wireless gateway 104 or combined wireless gateway and cable modem 110.

The inventors have determined that the timing of data transmissions between wireless network 101 and wired network 107 is not synchronized. For real-time applications such as Voice over Internet Protocol (VoIP), transmit/receive duty cycles may be periodically scheduled over wired network 107 based on, for example, DOCSIS Unsolicited Grant Service (UGS). The transmissions based on IEEE 802.11(e) and DOCKS protocols may be scheduled independently. For example, a wireless gateway and cable modem 110 transmits a CF poll periodically to receive data from wireless device 102. However, the time at which data is received from wireless device 102 may not be synchronized with a next transmit opportunity that is used to transmit the received data to cable modem termination system 108. Therefore, duty cycles for transmissions over wireless network 101 and wired network 107 may not be aligned. The misalignment of duty cycles may cause data to be buffered longer than needed at wireless gateway and cable modem 110 and thereby increase a delay in transmitting data to CMTS 108. This lack of synchronization between sending a CF poll and data transmission to CMTS 108 during a next transmit opportunity can lead to significant delays which hinder proper functioning of certain applications, for example, voice over IP (VoIP) applications. In the extreme case, the misalignment of data transmission timing between wireless network 101 and wired network 107 can be as long as one scheduling period. For real-time applications such as VoIP, an increased packet delay is not desirable since it can significantly degrade quality of service.

Figure 1B:
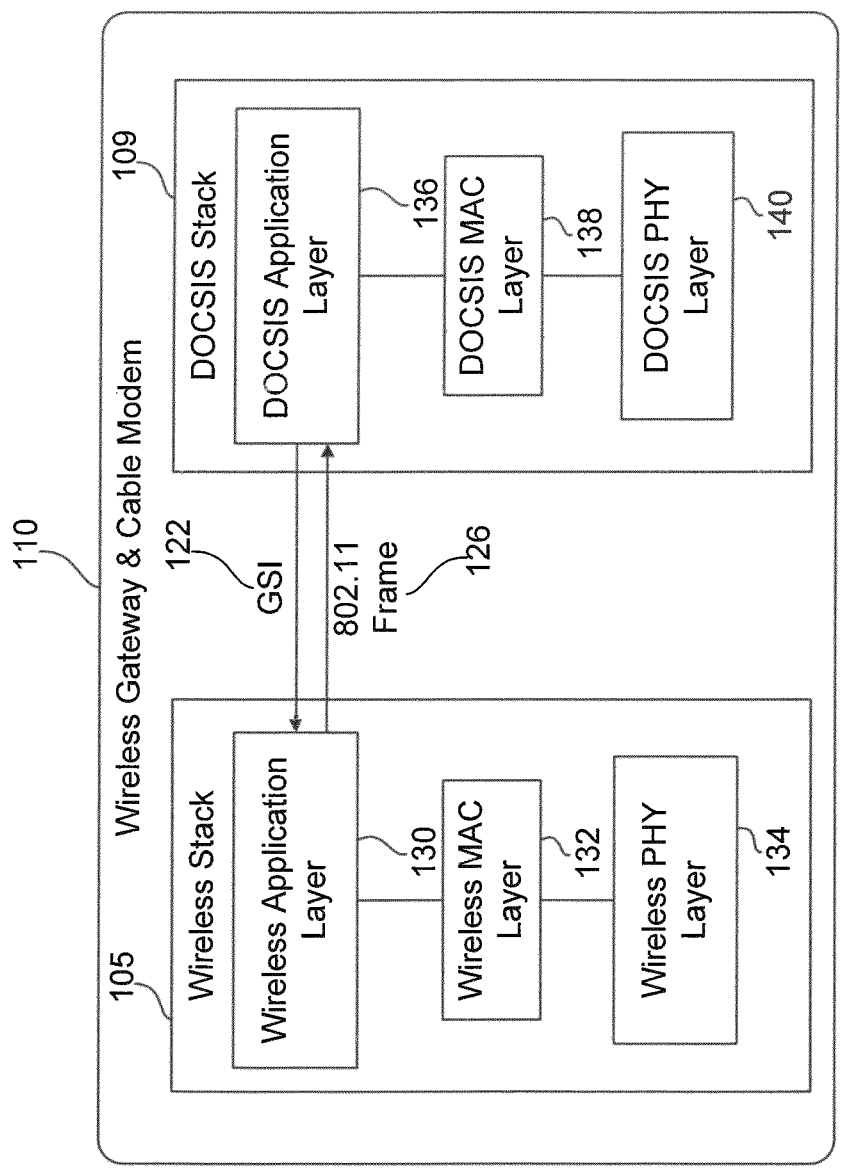
FIG. 1B illustrates a wireless stack and a DOCSIS stack according to an embodiment of the invention.

Accordingly, the inventors have determined methods, systems and computer program products to synchronize timing of data transmissions between wireless network 101 and wired network 107. FIG. 1A illustrates an example communication system 100 to synchronize timing of data transmissions between wireless network 101 and wired network 107 using a wireless gateway and cable modem according to an embodiment of the invention. Wireless gateway and cable modem 110 includes both a wireless stack 105 and a DOCSIS stack 109 (see FIG. 1B). DOCSIS stack 109 receives a DOCSIS MAP message 120 from cable modem termination system 108 that indicates future transmit opportunities during which combined wireless gateway and cable modem 110 can transmit data to cable modem termination system 108. In order to synchronize the time at which data is received from wireless device 102 and when data is transmitted to CMTS 108, DOCSIS stack 109 generates a grant synchronization indicator (GSI) 122 that is sent to wireless stack 105 prior to a "look-ahead time period." The look-ahead time period as referred to herein is a time period from transmitting GSI 122 to transmitting a DOCSIS frame (that includes data received from wireless device 102 in response to GSI 122) to CMTS 108.

According to an embodiment of the invention, GSI 122 causes wireless stack 105 to generate a CF poll 124. Upon receiving the CF poll 124, if wireless device 102 has data for transmission, then wireless device 102 sends that data in an IEEE 802.11 frame 126 to wireless gateway and cable modem 110. Wireless stack 105 forwards the IEEE 802.11 frame 126 to DOCSIS stack 109. DOCSIS stack 109 encapsulates data in the IEEE 802.11 frame into a DOCSIS frame 128. DOCSIS stack 109 transmits DOCSIS frame 128 over DOCSIS network 107 to CMTS 108 based on next transmit opportunities allotted for transmission to wireless gateway and cable modem 110 by DOCSIS MAP message 120. Thus, by generating GSI message 122 prior to the look-ahead time period, wireless gateway and cable modem 110 can synchronize the timing between when data is received from wireless device 102 and when it is transmitted to cable modem termination system 108.

It is a further objective of the invention to minimize a delay in time between receiving the IEEE 802.11 frame 126 from wireless device 102 and transmitting DOCSIS frame 128 during the next transmit opportunity. Embodiments presented herein may adjust the look-ahead time period so a delay between receiving 802.11 frame 126 from wireless device 102 and transmitting DOCSIS frame 128 is minimal. A "round-trip time period" as defined herein is a time period between transmitting GSI 122 and receiving the IEEE 802.11 frame 126 from wireless device 102. In an example, a difference between the look-ahead time period and the round-trip time period is determined. If it is determined that the difference is greater than a margin time period, then the look-ahead time period is decreased so that the difference is substantially equal to the margin time period. If it is determined that the difference is less than the margin time period then the look-ahead time period is increased so that the difference is substantially equal to the margin time period. Table 1 below shows examples of adjustments made to the look-ahead time period.

TABLE 1

| Look-ahead time period | Round-trip time period | Difference | Margin time period | Adjusted Look-ahead time period |
|---|---|---|---|---|
| 7 | 6 | 1 | 5 | 11 |
| 15 | 9 | 6 | 5 | 14 |
| 7 | 2 | 5 | 5 | 7 |
| 8 | 9 | −1 | 5 | 14 |

The adjusted look-ahead time period is used the next time GSI 122 is transmitted. In an example, a moving average of the round-trip time period is used when determining an adjusted look-ahead time period. For example, a roundtrip time period for every duty cycle may differ because of network conditions in wireless network 101 and/or delays caused by wireless device 102. Because of these unpredictable delays, a moving window average of the roundtrip delay may be used and/or a moving average of the look-ahead time period may be used.

In an example, the embodiment presented in FIG. 1A may be implemented by modifying firmware in wireless gateway and cable modem 110 to generate GSI 122 prior to the look-ahead time period and to generate CF poll 124 upon receiving GSI 122.

Figure 2A:
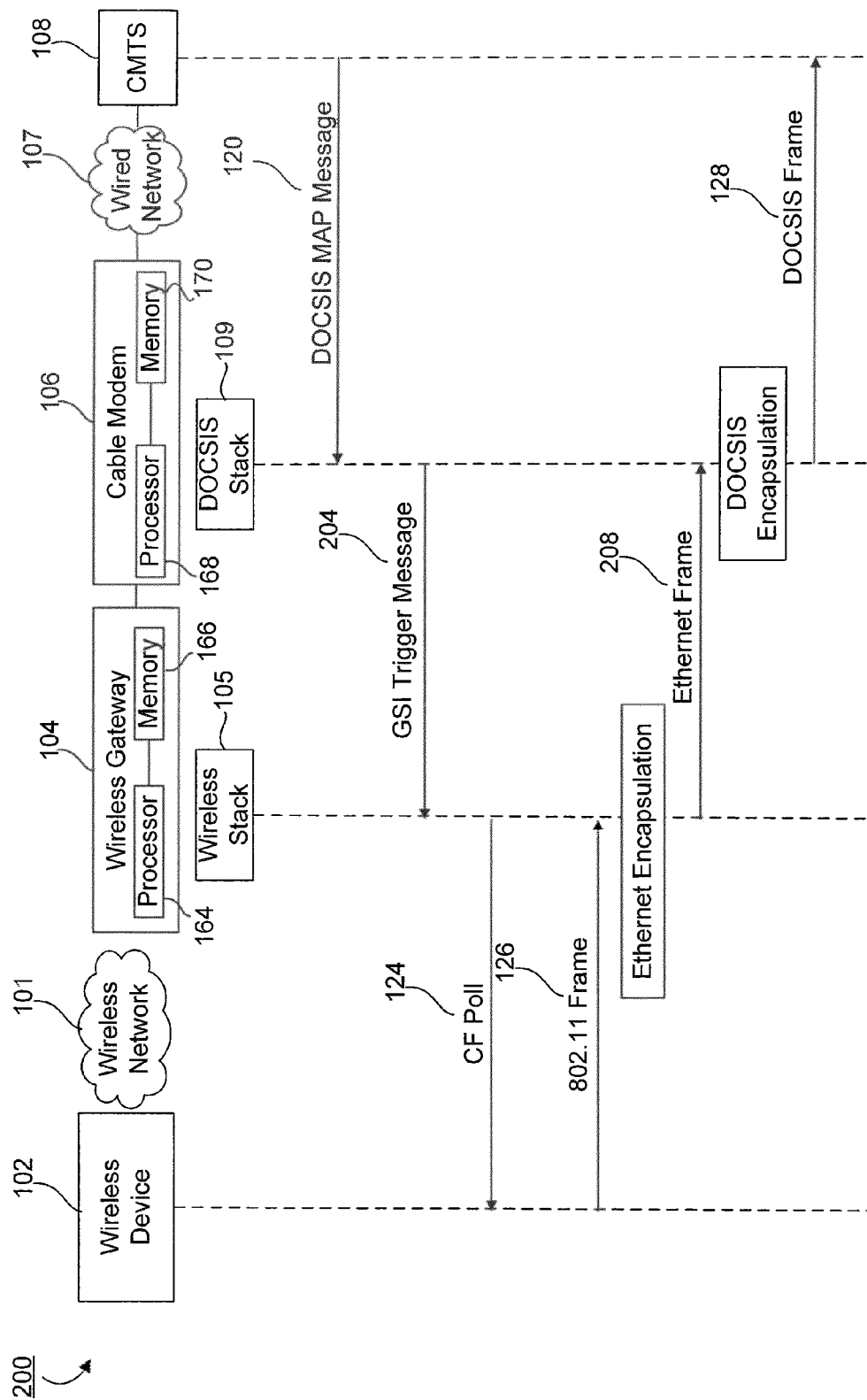
FIG. 2A illustrates an example system to synchronize timing of data transmissions between a wireless network and a wired network according to a further embodiment of the invention.
Figure 2B:
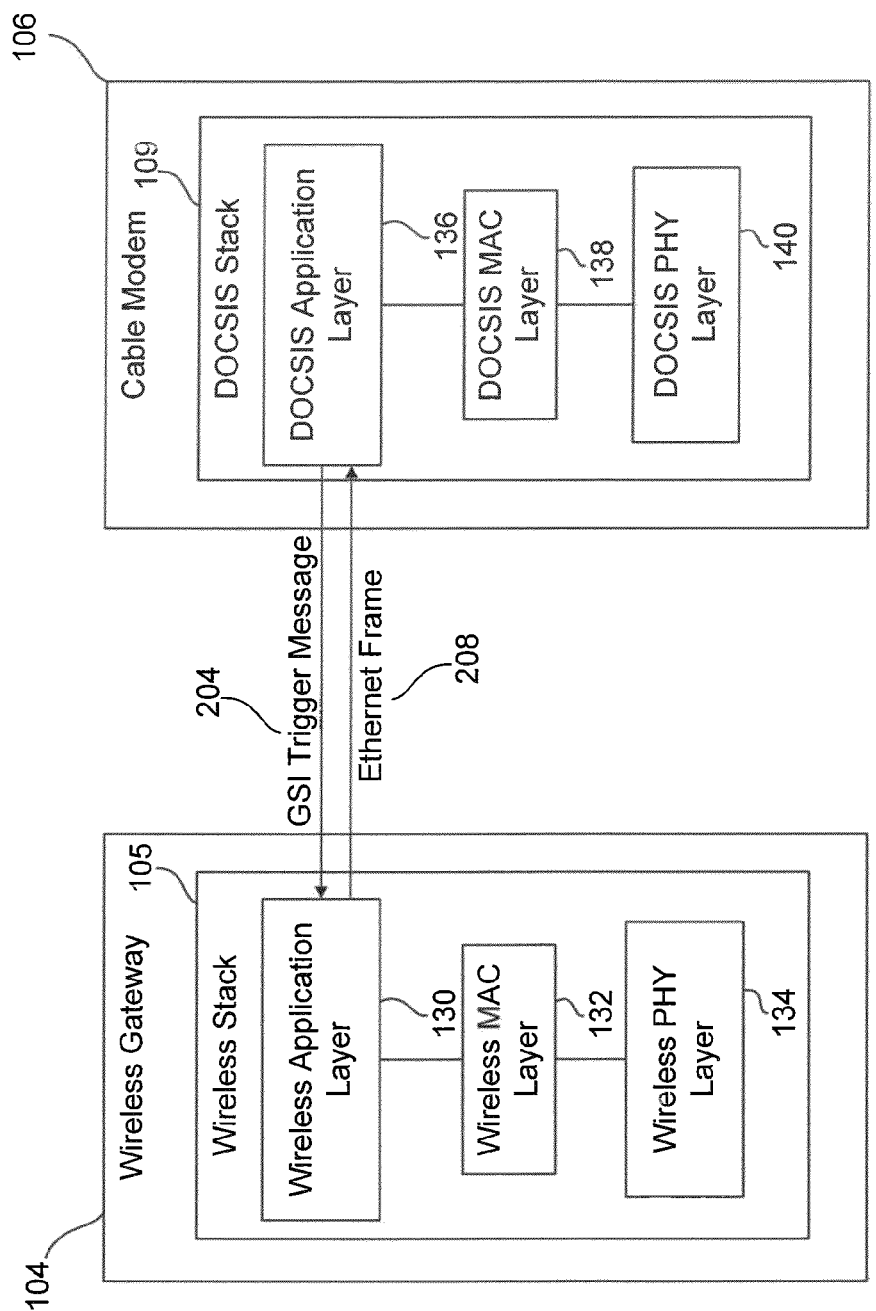
FIG. 2B illustrates a wireless stack and a DOCSIS stack according to a further embodiment of the invention.

FIG. 2B illustrates wireless stack 105 and DOCSIS stack 107 in wireless gateway and cable modem 110 according to an embodiment of the invention. Wireless stack 105 includes wireless application layer 130 which is coupled to wireless Media Access Control (MAC) layer 122, which in turn is coupled to wireless physical (PHY) layer 134. DOCSIS stack 109 includes DOCSIS application layer 136 that is coupled to DOCSIS MAC layer 138, which in turn is coupled to DOCSIS PHY layer 140.

According to an embodiment of the invention, DOCSIS application layer 136, based on a timing signal generated by DOCSIS MAC layer generates GSI 122 that is transmitted to the wireless application layer 130 in wireless stack 105. The timing signal is based on DOCSIS MAP message 120 that is received from CMTS 108 and indicates the time slots for future transmission opportunities. In an example, portions of DOCSIS stack 109 and wireless stack 105 may run on a common processor 160 based on instructions stored in memory 162. If DOCSIS stack 109 and wireless stack 105 run on the same processor 160, then GSI 122 may be transmitted via internal messages such as software function calls. In another example, portions of DOCSIS stack 109 may run on a separate processor (not shown) than wireless stack 105 and GSI 122 may be transmitted via messages between the processors. In yet another example, DOCSIS stack 109 and wireless stack 105 may be implemented in hardware and GSI 122 may be a signal that is transmitted between DOCSIS application layer 136 and wireless application layer 130.

Figure 1C:
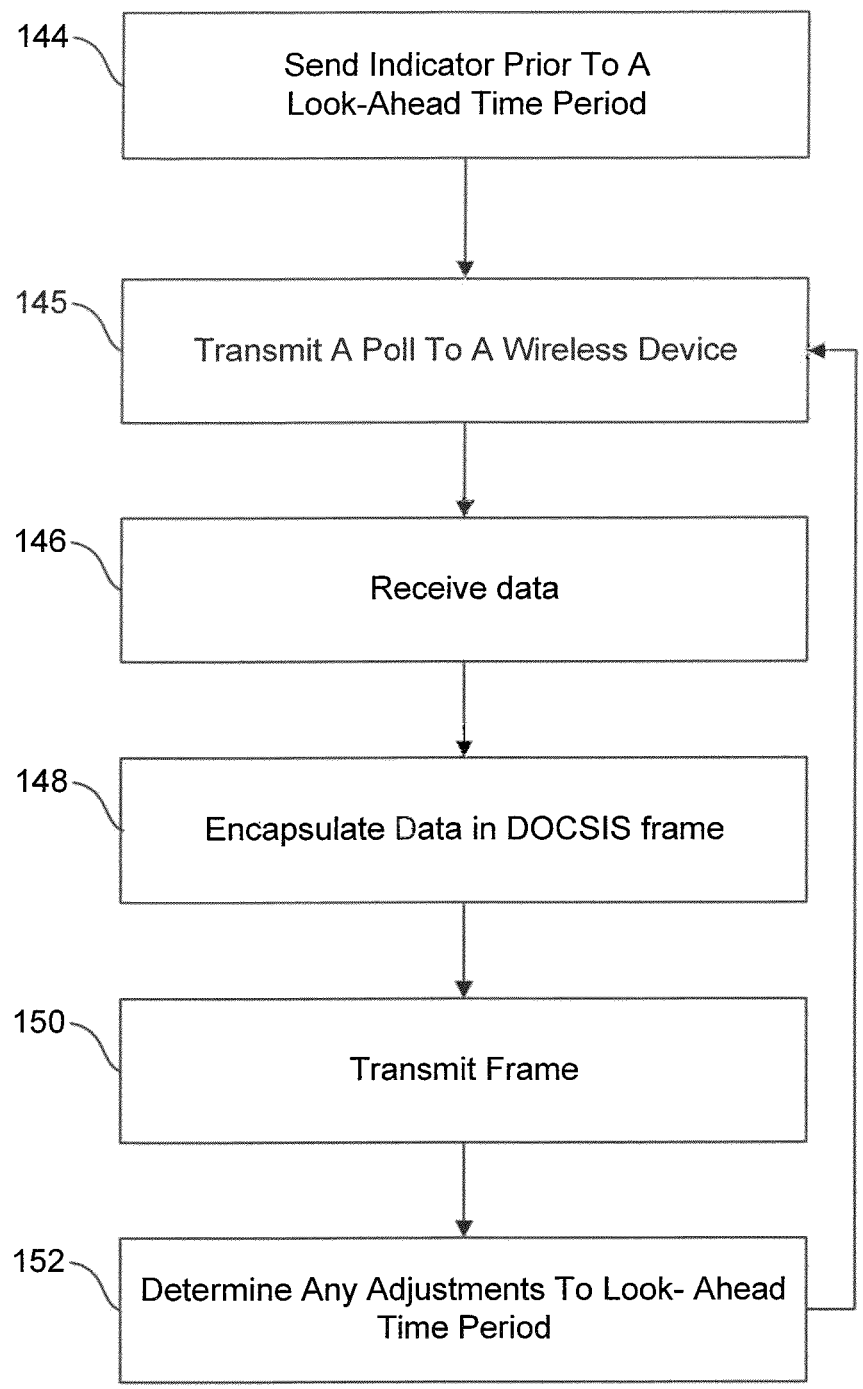
FIG. 1C illustrates an example flowchart illustrating steps performed by wireless gateway and cable modem to synchronize timing of data transmissions between wireless network and wired network according to an embodiment of the invention.

FIG. 1C illustrates an example flowchart 142 illustrating steps performed by wireless gateway and cable modem 110 to synchronize timing of data transmissions between wireless network 101 and wired network 107 according to an embodiment of the invention. Flowchart 142 will be described with continued reference to the example operating environment depicted in FIG. 1A. However, the flowchart is not limited to this embodiment. Note that some steps shown in flowchart 142 do not necessarily have to occur in the order shown. The steps in flow chart 142 may be performed by, for example, processor 160 based on instructions stored in memory 162.

In step 144, an indicator is sent prior to a look-ahead time period. For example, GSI 122 is sent from DOCSIS stack 109 to wireless stack 105 prior to a look-ahead time period.

In step 145, a poll is transmitted to a wireless device upon receiving the indicator. For example, a CF poll 124 is transmitted by wireless stack 105 to wireless device 102 upon receiving GSI 122.

In step 146, data is received from the wireless device. For example, an 802.11 frame 126 is received from wireless device 102.

In step 148, the data received from wireless device 102 is converted to a DOCSIS format. For example, data in the 802.11 frame 126 is converted into a DOCSIS or is encapsulated into a DOCSIS frame by DOCSIS stack 109.

In step 150, the DOCSIS frame is transmitted to a cable modem termination system. For example, DOCSIS frame 128 is transmitted to cable modem termination system 108 at a next transmit opportunity as indicated by DOCSIS MAP message 120.

In step 152, it is determined whether the look-ahead time period is to be adjusted based on a round-trip time period. Flowchart 300 (see FIG. 3) illustrates an example algorithm that may be used to adjust the look-ahead time according to an embodiment of the invention. After determining any adjustments to the look-ahead time period, control proceeds back to step 144.

FIG. 2A illustrates an example system 200 to synchronize timing of data transmissions between a wireless network and a wired network according to an embodiment of the invention.

In the example in FIG. 2A, wireless gateway 104 and cable modem 106 are physically separate devices with wireless gateway 104 being coupled to cable modem 106 via an Ethernet cable. Wireless gateway 104 sends data encapsulated in the IEEE 802.11 frames in an Ethernet format to cable modem 106. Cable modem 106 may encapsulate or convert the Ethernet frames into a DOCSIS format and transmit them to cable modem termination system 108 for further transmission over another network such as the Internet. Thus, data is transmitted from a wireless device 102 over wireless network 101 to wireless gateway 104 and from wireless gateway 104 and cable modem 106 over wired network 107 to CMTS 108.

In the embodiment show in FIG. 2A, wireless gateway 104 and cable modem 106 are standalone devices. Cable modem 106 implements a DOCSIS stack 109 and wireless gateway 104 implements a wireless stack 105 as shown in FIG. 2B. DOCSIS stack 109 in cable modem 106 receives a DOCSIS MAP message 120 from cable modem termination 108 that indicates future transmit opportunities for cable modem 106. DOCSIS stack 109 generates a GSI trigger message 204. In an example, DOCSIS application layer 136 (see FIG. 2B) generates the GSI trigger message 204 based on timing information received from DOCSIS MAC layer 138. The timing information received from DOCSIS MAC layer 138 is based on the time slots for the next transmit opportunity indicated by DOCSIS MAP message 120. The GSI trigger message 204 is transmitted by DOCSIS application layer 136 to wireless stack 105 in wireless gateway 104. In an example, the message may be sent to wireless application layer 130 in wireless stack 105 (see FIG. 2B). In an example, cable modem 106 and wireless gateway 104 may be coupled via an Ethernet network (not shown) and GSI trigger message 204 is a message formatted according to the Ethernet protocol.

Upon receiving GSI trigger message 204, wireless gateway 104 transmits CF poll 124. In response to CF poll 124, wireless device 202 transmits an IEEE 802.11 frame 126 to wireless gateway 104. Wireless gateway 104 encapsulates the data in 802.11 frame 126 into an Ethernet format to generate Ethernet frame 208. Wireless gateway 104 transmits Ethernet frame 208 to cable modem 106. Wireless gateway may generate CF poll 124 and Ethernet frame 208 using processor 164 based on instructions stored in memory 166.

Upon receiving Ethernet frame 208, cable modem 106 encapsulates data in Ethernet frame 208 into a DOCSIS format using DOCSIS encapsulation and transmits DOCSIS frame 128 to cable modem termination system 108 at the next transmit opportunity as indicated by DOCSIS MAP message 120. Thus, by generating GSI trigger 204 prior to the look-ahead time period, cable modem 106 can synchronize the timing between when data is received from wireless device 102 and when it is transmitted to cable modem termination system 108.

In the embodiment presented in FIG. 2A, the round-trip time is the time period between transmitting GSI trigger message 204 and receiving Ethernet frame 208. According to an embodiment of the invention, the look-ahead time period may be modified based on the difference between the look-ahead time period and the round-trip time period. If the difference is greater than the margin period, then the look-ahead time period may be decreased. If the difference is less than the margin time period, then the look-ahead time period may be increased.

In an example, cable modem 106 may generate GSI trigger message 204 using processor 168 based on instructions stored in memory 170 and wireless gateway 104 may generate CF poll 124 using processor 164 based on instructions stored in memory 166. In an example, the embodiment presented in FIG. 2A may be implemented by modifying firmware and cable modem 106 to generate GSI trigger message 204 prior to the look-ahead time period and by modifying firmware in wireless gateway 104 to generate CF poll 124 upon receiving GSI trigger message 204.

Figure 2C:
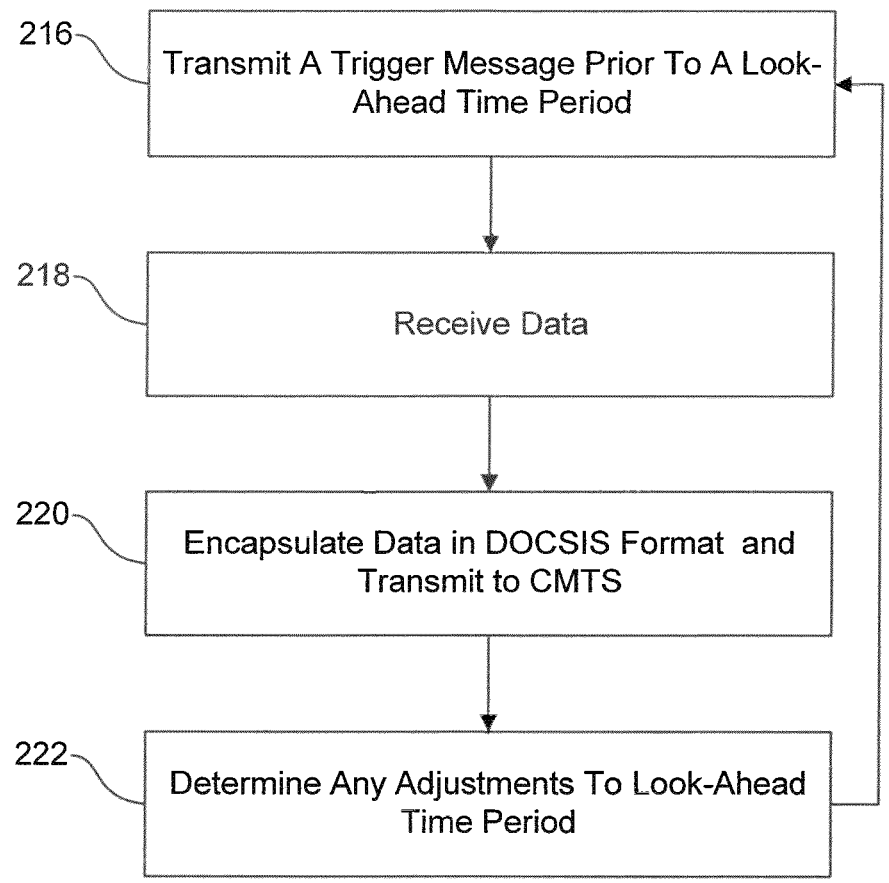
FIG. 2C illustrates an example flowchart illustrating steps performed in a cable modem to synchronize timing of data transmissions between a wireless network and wired network according to an embodiment of the invention.

FIG. 2C illustrates an example flowchart 214 illustrating steps performed in a cable modem 106 to synchronize timing of data transmissions between a wireless network 101 and wired network 107 according to an embodiment of the invention. Flowchart 214 will be described with continued reference to the example operating environment depicted in FIG. 2A. However, the flowchart is not limited to this embodiment. Note that some steps shown in flowchart 214 do not necessarily have to occur in the order shown. The steps in flow chart 214 may be performed by, for example, processor 168 based on instructions stored in memory 170.

In step 216, a trigger message prior to a look-ahead time period is transmitted to a wireless gateway. For example. GSI trigger message 204 is transmitted by cable modem 106 to wireless gateway 104 prior to a look-ahead time period.

In step 218, a packet is received from the wireless gateway. For example, an Ethernet frame 208 is received from wireless gateway 104.

In step 220, the data received in step 218 is encapsulated in a DOCSIS format and transmits the DOCSIS frame to a cable modem termination system. For example, cable modem 106 encapsulates data received from wireless gateway 104 in a DOCSIS format and transmits the packet to a cable modem termination system 108.

In step 222, any adjustments to the look-ahead time period are determined. For example, the steps shown in flowchart 300 may be used to determine any adjustments to the look-ahead time period according to an embodiment of the invention. Control proceeds to step 216 where the adjusted look-ahead time period may be used for a next iteration of data transmission.

Figure 2D:
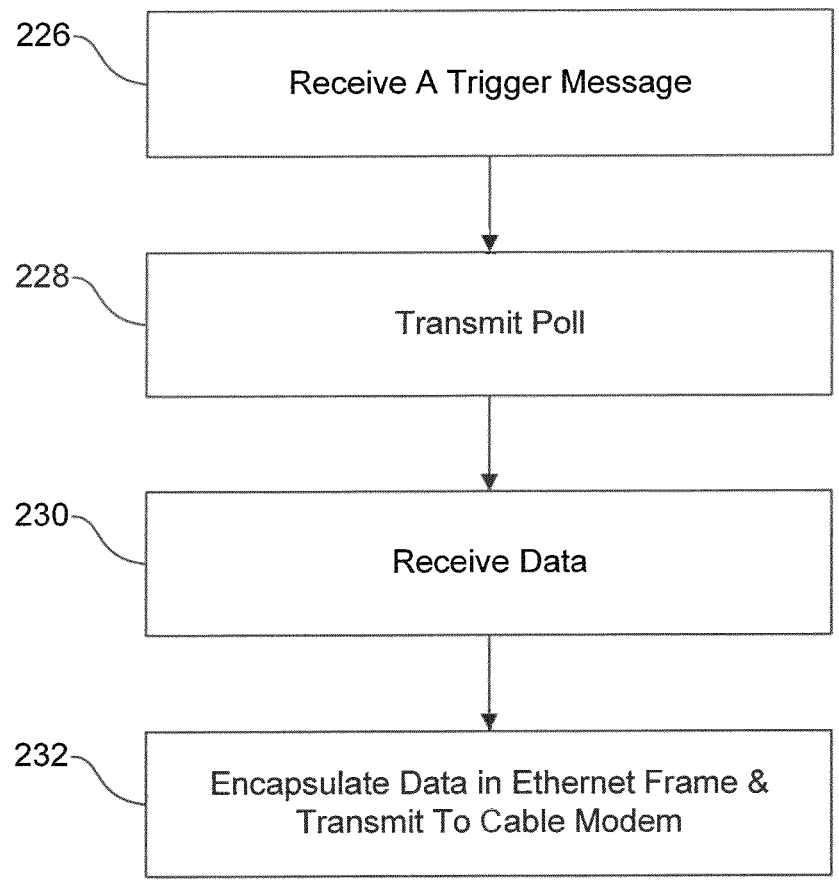
FIG. 2D illustrates an example flowchart illustrating steps performed by a wireless gateway to synchronize data transmission between a wireless network and a wired network according to an embodiment of the invention.

FIG. 2D illustrates an example flowchart 224 illustrating steps performed by a wireless gateway to synchronize data transmission between a wireless network and a wired network according to an embodiment of the invention. Flowchart 224 will be described with continued reference to the example operating environment depicted in FIG. 2A. However, the flowchart is not limited to this embodiment. Note that some steps shown in flowchart 224 do not necessarily have to occur in the order shown. The steps in flow chart 214 may be performed by, for example, processor 164 based on instructions stored in memory 166.

In step 226, a trigger message is received from a cable modem. For example, GSI trigger message 204 is received from cable modem 106.

In step 228, based on the trigger message received in step 226, a poll is sent to a wireless device. For example, based on GSI trigger message 204, a CF poll 124 is transmitted to wireless device 102.

In step 230, data is received from the wireless device. For example, an 802.11 frame 126 is received from wireless device 102.

In step 232, the data received from wireless device is encapsulated into an Ethernet frame and transmitted to the cable modem. For example, the data in the 802.11 frame 126 is encapsulated in an Ethernet format to generate Ethernet frame 208 which is transmitted to cable modem 106.

Figure 3:
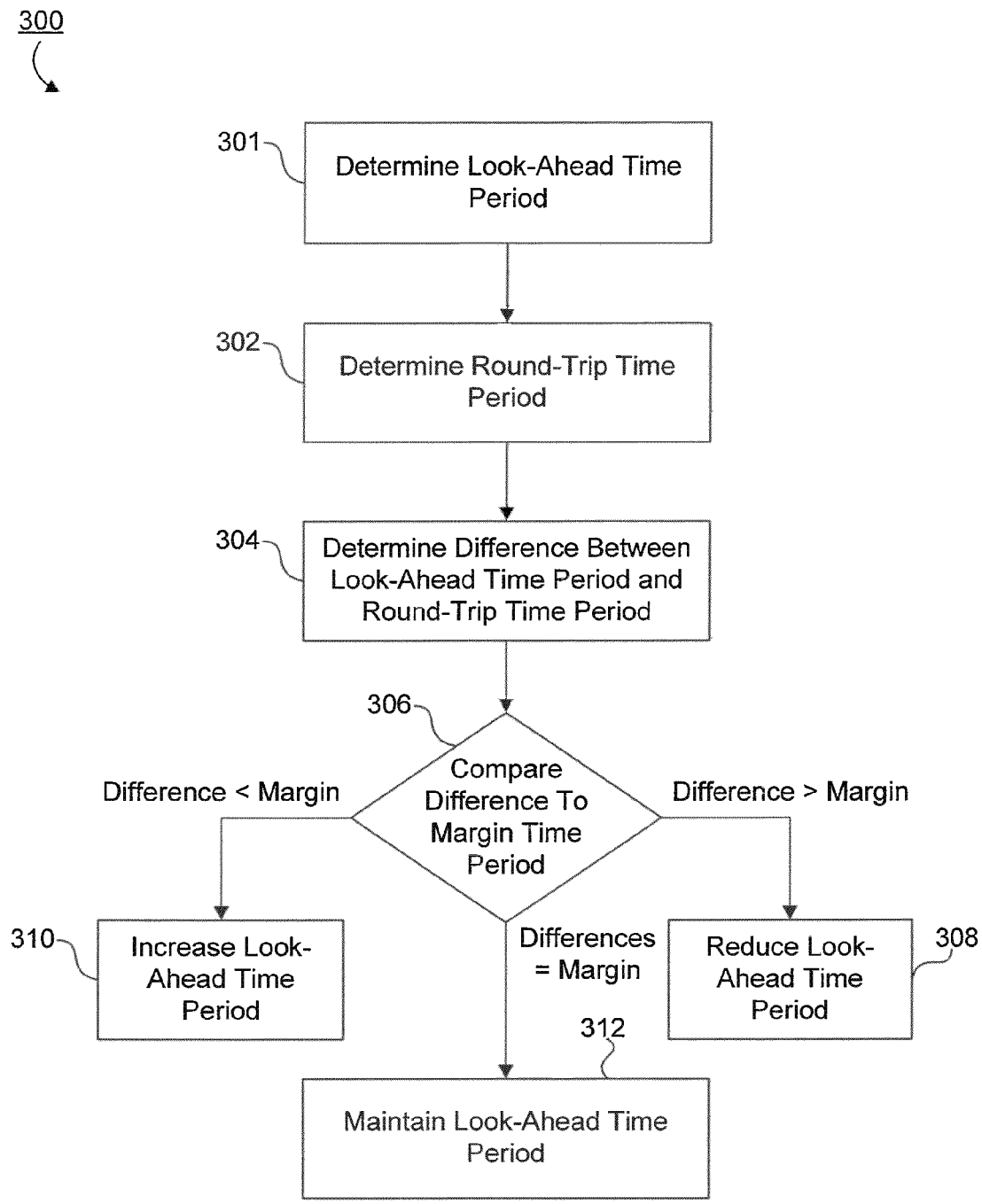
FIG. 3 illustrates an example flowchart showing steps performed to optimize or adjust the look-ahead time period according to an embodiment of the invention.

FIG. 3 illustrates an example flowchart 300 showing steps performed to optimize or adjust the look ahead time period according to an embodiment of the invention. Flowchart 300 will be described with continued reference to the example operating environments depicted in FIGS. 1A and 2A. However, the flowchart is not limited to these embodiments. Note that some steps shown in flowchart 300 do not necessarily have to occur in the order shown. The steps in flow chart 300 may be performed by, for example, processor 168 based on instructions stored in memory 170 of cable modem 106. In another example, the steps shown in flowchart 300 may be performed by processor 160 based on instructions in memory 162 of wireless gateway and cable modem 110.

In step 301, a look ahead time period is determined. For example, wireless gateway and cable modem 110 may determine the look-ahead time period as the time period between transmitting GSI 122 and transmitting DOCSIS frame 128. In another example, cable modem 106 may determine the look-ahead time period to be the time period between transmitting GSI trigger message 204 and transmitting DOCSIS frame 128.

In step 302, a round-trip time period is determined. For example, wireless gateway and cable modem 110 determines the round-trip time period to be a time period between transmitting GSI 122 and receiving 802.11 frame 126 from wireless device 102. In another example, cable modem 106 determines the round-trip time period to be the time period between transmitting GSI trigger message 204 and receiving Ethernet frame 208.

In step 304, a difference between the look-ahead time period and the round-trip time period is determined.

In step 306, the difference from step 304 is compared to a margin time period.

If it is determined in step 306 that the difference is greater than the margin time period, then control proceeds to step 308. In step 308, the look-ahead time period is reduced to be equal to the margin time period.

If it is determined in step 306 that the difference is less than the margin time period, then in step 310, the look-ahead time period is increased so that the difference is equal to the margin time period.

If it is determined in step 306 that the difference is substantially equal to the margin time period, then the look-ahead time period is not changed.

In an example, the margin time period is a buffer time period between receiving data and transmitting the received data to a cable modem termination system. In an example, the margin time period is predetermined by a cable operator and programmed into wireless gateway and cable modem 110 or cable modem 108. In yet another example, the margin time period may be periodically adjusted based on a moving average of the difference between look-ahead time period and the round-trip time period.

Embodiments presented herein, or portions thereof, can be implemented in hardware, firmware, software, and/or combinations thereof. The embodiments presented herein apply to any communication system that requires synchronization of timing of data transmissions between a wireless network and a wired network.

The representative functions described herein (e.g. functions performed by processors 160, 164 and 168, wireless gateway and cable modem 110, wireless gateway 104 and cable modem 106 can be implemented in hardware, software, or some combination thereof. For instance, the method of flowcharts 142, 214, 224 and 300 can be implemented using computer processors, such as one of processors 160, 164 and 168, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the processing functions described herein could be embodied by computer program instructions that are executed by a computer processor, for example processors 160, 164 and 168, or any one of the hardware devices listed above. The computer program instructions cause the processor to perform the instructions described herein. The computer program instructions (e.g. software) can be stored in a computer usable medium, computer program medium, or any storage medium that can be accessed by a computer or processor. Such media include a memory device, such as memory 162, 166 and 170, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

Conclusion

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A combined wireless gateway and cable modem to synchronize timing of data transmissions between wireless and wired networks, comprising:
    a processor; and
    a memory, coupled to the processor, the memory configured to store instructions that when executed by the processor, cause the processor to:
        send an indicator prior to a look-ahead time period;
        transmit a poll to a wireless device upon receiving the indicator;
        receive data from the wireless device;
        encapsulate the data in a frame; and
        transmit the frame at a start of a next transmit opportunity,
        wherein the look-ahead time period is a time period from transmitting the indicator to transmitting the frame.

2. The wireless gateway and cable modem of claim 1, wherein the indicator is a grant synchronization indicator (GSI) that is generated by a Data Over Cable Service interface Specification (DOCSIS) application layer based on a timing signal received from a DOCSIS Media Access Control (MAC) layer.

3. The wireless gateway and cable modem of claim 1, wherein the indicator is sent by a Data Over Cable Service Interface Specification (DOCSIS) application layer to a wireless device application layer within the combined wireless gateway and cable modem.

4. The wireless gateway and cable modem of claim 1, wherein the poll is a contention free (CF) poll of the Institute of Electrical and Electronics Engineers (IEEE) 802.11(e) standard.

5. The wireless gateway and cable modem of claim 1, wherein the next transmit opportunity is a next time slot for transmission of data received from the wireless device; and wherein the next time slot is allotted to the combined wireless gateway and cable modem by a Cable Modem Termination System (CMTS) in a Data Over Cable Service Interface Specification (DOCSIS) MAP message.

6. The wireless gateway and cable modem of claim 1, wherein the memory is further configured to store instructions that, when executed by the processor, further cause the processor to;
 determine a round-trip time period, wherein the round-trip time period is the time period from transmitting the indicator to receiving the data from the wireless device;
 determine a difference between the look-ahead time period and the round-trip time period;
 decrease the look-ahead time period if the difference is greater than a margin time period; and
 increase the look-ahead time period if the difference is less than the margin time period.

7. The wireless gateway and cable modem of claim 6, wherein the memory is further configured to store instructions that, when executed by the processor, further cause the processor to:
 increase the look-ahead time period for a next transmit opportunity so that the difference is substantially equal to the margin time period.

8. The wireless gateway and cable modem of claim 6, wherein the memory is further configured to store instructions that, when executed by the processor, further cause the processor to:
 decrease the look-ahead time period for a next transmit opportunity so that the difference is substantially equal to the margin time period.

9. A cable modem to synchronize timing of data transmissions between wireless and wired networks using a cable modem, comprising:
 a processor; and
 a memory, coupled to the processor, configure to store instructions that, when executed by the processor, cause the processor to:
   generate an indicator prior to a look-ahead time period;
   transmit a poll trigger to a wireless gateway upon generating the indicator;
   receive data from the wireless gateway;
   encapsulate the data in a frame; and
   transmit the frame at a start of a next transmit opportunity,
   wherein the look-ahead time period is a time period from generating the indicator to transmitting the frame.

10. The cable modem of claim 9, wherein the indicator is a Grant Synchronization Indicator that is generated by a Data Over Cable Service Interface Specification (DOCSIS) application layer based on a timing signal received from a DOCSIS Media Access Control (MAC) layer of the cable modem.

11. The cable modem of claim 9, wherein the poll trigger is a Grant Synchronization Indicator (GSI) trigger message that is configured to cause the wireless gateway to transmit a contention free (CF) poll to a wireless device.

12. The cable modem of claim 9, wherein the next transmit opportunity is a next time slot for transmission of data received from a wireless device; and wherein the next time slot is allotted to the cable modem by a Cable Modem Termination System (CMTS) in a Data Over Cable Service Interface Specification (DOCSIS) MAP message.

13. The cable modem of claim 9, wherein the memory is further configured to store instructions that, when executed by the processor, further cause the processor to:
 determine a round-trip time period, wherein the round-trip time period is the time period from transmitting the indicator to receiving the data from the wireless gateway;
 determine a difference between the look-ahead time period and the round-trip time period;
 increase the look-ahead time period if the difference is lesser than a margin time period; and
 decrease the look-ahead time period if the difference is greater than the margin time period.

14. The cable modem of claim 13, wherein the memory further stores instructions that when executed by the processor, cause the processor to:
 increase the look-ahead time period so that the difference is substantially equal to the margin time period for a next transmit opportunity.

15. The cable modem of claim 13, wherein the memory further stores instructions that when executed by the processor, cause the processor to:
 decrease the look-ahead time period so that the difference is substantially equal to the margin time period for a next transmit opportunity.

16. A method, to synchronize timing of data transmissions between wireless and wired networks, comprising:
 receiving a trigger message from a cable modem;
 transmitting a poll to a wireless device upon receiving the trigger message;
 receiving data from the wireless device;
 encapsulating the data in a frame; and
 transmitting the frame to the cable modem.

17. The method of claim 16, wherein the trigger message is a contention free (CF) poll of the Institute of Electrical and Electronics Engineers (IEEE) 802.11(e) protocol.

18. The method of claim 17, wherein the trigger message is based on a look-ahead time period, and wherein the look-ahead time period is a time period between transmitting the trigger message by the cable modem and transmitting a Data Over Cable Service Interface Specification (DOCSIS) frame by the cable modem to a cable modem termination system (CMTS).

19. The method of claim 18, wherein the DOCSIS frame includes data in an Ethernet frame.

20. The method of claim 16, wherein the frame is an Ethernet frame.

\* \* \* \* \*

UNITED STATES PATENT AND TRADEMARK OFFICE
CERTIFICATE OF CORRECTION

PATENT NO. : 8,902,878 B2
APPLICATION NO. : 13/720185
DATED : December 2, 2014
INVENTOR(S) : Li et al.

Page 1 of 1

It is certified that error appears in the above-identified patent and that said Letters Patent is hereby corrected as shown below:

In the Claims,

Column 10, line 55, "interface" is replaced with --Interface--.

Column 11, line 11, "to;" is replaced with --to:--.

Signed and Sealed this
Fourteenth Day of April, 2015

Michelle K. Lee
*Director of the United States Patent and Trademark Office*